(12) United States Patent
Santoiemmo

(10) Patent No.: US 7,293,724 B2
(45) Date of Patent: Nov. 13, 2007

(54) ANIMAL BEDDING COMPOSITION METHOD OF MANUFACTURE

(75) Inventor: Carl V. Santoiemmo, Willoughby Hills, OH (US)

(73) Assignee: Hunt Club Animal Bedding, LLC, Greensboro, NC (US)

( * ) Notice: Subject to any disclaimer, the term of this patent is extended or adjusted under 35 U.S.C. 154(b) by 0 days.

(21) Appl. No.: 10/183,773

(22) Filed: Jun. 27, 2002

(65) Prior Publication Data

US 2002/0168330 A1 Nov. 14, 2002

(51) Int. Cl.
*B02C 18/02* (2006.01)

(52) U.S. Cl. ............................................. 241/29; 83/39

(58) Field of Classification Search ............... 424/76.6, 424/412, 413; 241/30, 25, 24.1, 24.19, 24.29, 241/24.15, 29; 83/39
See application file for complete search history.

(56) References Cited

U.S. PATENT DOCUMENTS

| | | | |
|---|---|---|---|
| 2,708,418 A | 5/1955 | Sugarman | |
| 3,255,762 A | 6/1966 | Baler | |
| 4,376,422 A | 3/1983 | Whitehead et al. | |
| 4,437,429 A | 3/1984 | Goldstein et al. | |
| 4,465,019 A | 8/1984 | Johnson | |
| 4,778,116 A * | 10/1988 | Mayberry | .................. 241/79.1 |
| 4,938,155 A | 7/1990 | Williams | |
| 5,133,296 A | 7/1992 | Crawford | |
| 5,189,987 A | 3/1993 | Stanislowski et al. | |
| 5,195,465 A | 3/1993 | Webb et al. | |
| 5,209,186 A | 5/1993 | Dewing | |
| 5,265,561 A | 11/1993 | Crawford | |
| 5,352,780 A | 10/1994 | Webb et al. | |
| 5,372,314 A | 12/1994 | Manning | |
| 5,456,737 A | 10/1995 | Manning | |
| 5,510,310 A | 4/1996 | Manning | |
| 5,634,431 A | 6/1997 | Reddy et al. | |
| 5,712,020 A * | 1/1998 | Parker | ........................ 428/182 |
| 6,251,147 B1 * | 6/2001 | Peterson et al. | .............. 44/576 |
| 6,276,300 B1 | 8/2001 | Lewis, II et al. | |
| 6,436,384 B2 | 8/2002 | Santoiemmo | |
| 7,150,903 B2 * | 12/2006 | Frey | ............................ 428/43 |

FOREIGN PATENT DOCUMENTS

| | | |
|---|---|---|
| DE | 200 04 472 U 1 | 3/2000 |
| EP | 0307229 | 3/1989 |
| GB | 2254769 | 10/1992 |
| GB | 2 261 586 A | 5/1993 |
| GB | 2261856 | 5/1993 |
| JP | 7206051 | 8/1995 |
| WO | WO 99/44647 | 9/1999 |

OTHER PUBLICATIONS

Interim Decision on Great Britain Patent No. 2,261,856 dated Mar. 17, 1997.
Decision on Great Britain Patent No. 2,261,856 dated Jul. 11, 1997.
Advertisement: "Ken Mills Engineering Ltd.: Animal Bedding Systems", www.kenmills.co.uk/prod05.htm, www.kenmills.co.uk/horse/Default.htm.
Steelhead Specialty Minerals, Sweet PDZ Product Description, Aug. 2001.

* cited by examiner

*Primary Examiner*—Mark Rosenbaum
(74) *Attorney, Agent, or Firm*—MacCord Mason PLLC

(57) ABSTRACT

An automated method and system of manufacturing an animal bedding composition includes cutting or shredding pieces of multiple panel corrugated cardboard structures having an internal corrugated panel sandwiched between outer panels and adding an adsorptive deodorizing ion exchange agent such as a zeolite dispersed throughout the cardboard pieces and carried on outer and inner surfaces of the pieces of cardboard and on outer and inner surfaces of the corrugations to provide a comfortable, hygienic and deodorized floor covering for animal stalls.

12 Claims, 4 Drawing Sheets ns, the inventionThe present invention relates generally to animal bedding
ANIMAL BEDDING COMPOSITION METHOD OF MANUFACTURE

PRIORITY CLAIM

This application claims the benefit of U.S. patent application Ser. No. 09/036,301 filed on Mar. 6, 1998 (now U.S. Pat. No. 6,436,384 B1, which issued Aug. 20, 2002) the entirety of which is hereby incorporated by reference.

FIELD OF THE INVENTION

The present invention relates generally to animal bedding materials and more specifically to synthetic or preprocessed materials which provide a comfortable stall floor covering, and control moisture, dust and odor in animal housing environments. The invention also relates to methods of making and packaging animal bedding materials and compositions.

BACKGROUND OF THE INVENTION

In a typical managed care facility for large animals such as horses, cows, etc., stalls are provided for occupancy by one or more animals at a time. A critical element of the stall is the flooring or bedding material, as animals spend many hours in a stall as a place for feeding and resting. Stall floors are typically dirt or concrete or, more recently, rubberized mats. Traditionally, straw or hay is distributed over the flooring to provide a softer surface and some very limited absorption of animal waste. In fact, straw and hay are not very absorbent, do not have adequate cushioning, and after mixing with animal waste become very slippery. Stall floors lined with organic materials such as straw or hay provide a breeding ground for various fungi which can cause respiratory and hoof infections, and induce allergic reactions in animals and humans. Furthermore, straw and hay do not perform any deodorizing or odor reducing function. Additives such as hydrated lime have been used with straw and hay as an ammonia/odor control agent. Lime has the disadvantages of high toxicity and is therefore relatively hazardous, low relative ammonia removal and high relative pH/high alkalinity, rendering the discarded stall material unsuitable for use as a fertilizer. Another disadvantage of straw and hay is the large amount of dust produced when these materials are applied to stall floors. This dust is inhaled by the animals causing irritation to the respiratory tract, making them more susceptible to the harmful effects of ammonia inhalation. This is particularly harmful to young animals that spend much of their time laying on stall floors where the dust accumulates. Dust is also unsanitary and hazardous and to the breeding and birthing processes.

Alternatively, a number of different materials, organic and inorganic, have been proposed for use as animal bedding material. Among these materials are cardboard, shredded paper such as recycled newsprint, wood shavings and mixtures of these materials. However, a number of disadvantages arise from use of these alternative materials. For instance, shredded paper is quickly saturated with animal urine and solid waste. It becomes matted and heavy and thus difficult to remove from the stall. Bedding material made from wood shavings, on the other hand, provides support and comfort, but has limited absorption characteristics and can contribute to fungal growth. Wood shavings are also slow to biodegrade and thus are unsuitable for use as fertilizer. An additional disadvantage of wood shavings is that the individual pieces get tangled in the hair, mane and tail of horses and other animals, making cleaning and grooming arduous.

An additional shortcoming of these prior art animal bedding materials is that they do not impede ammonia production in stalls where animals are housed. Even in small concentrations, ammonia can pose a health problem to animals. It has been shown that atmospheric ammonia is damaging to the respiratory tract. Even relatively low concentrations of ammonia can diminish airway defense mechanisms, making animals more vulnerable to pneumonia and asthma-like symptoms, leading to a higher incidence and increased severity of pneumonia, particularly in young animals. Lower weight gains have been observed in animals kept in stalls with ammonia concentrations as low as 25 ppm. Moreover, these materials offer no odor masking or odor reduction properties. The odors also attract flies and other insects which can carry disease and further stress the animals.

U.S. Pat. No. 5,209,186 describes an absorbent animal bedding material of nodules of cellulose material made from paper pulp produced from waste paper. These nodules have a smooth, hard, porous surface and resist breakage during use and handling. However, this material does not support the weight of large animals like horses and cows and creates dust when crushed. The nodules are crushed by the weight of these large animals, substantially reducing the amount of support and cushion provided by the bedding material. Also, this material is not easily or economically produced and requires numerous manufacturing steps and expensive mixing and heating equipment. Like the materials described above, this animal bedding material does not reduce ammonia production or odor.

U.S. Pat. No. 5,372,314 discloses an animal bedding material produced by mixing finely shredded cellulose material with calcium oxide and water to form a slurry. The slurry is then neutralized by mixing it with diatomaceous earth or a non-swelling clay and dried to form the animal bedding material. This animal bedding material is absorbent, but does not inhibit ammonia production and provides no relief from the unpleasant odor produced from animal waste.

U.S. Pat. Nos. 5,195,465 and 5,352,780 each describe a litter material made from compacted cellulose which has been formed into pellets and flaked. Both of these patents suggest adding fungicides, coloring agents, insecticides and herbicides to the flaked material to extend the life of the litter and reduce bacterial and fungal growth. However, neither patent offers a solution to the odor and ammonia production problems associated with other prior art animal bedding materials.

It has also been suggested in U.S. Pat. Nos. 5,133,296 and 5,265,561 to combine waste cardboard and wood pallets to make animal bedding material. However, the addition of the wood to the cardboard substantially decreases the biodegradability of this material making the bedding material essentially useless as fertilizer after it has become saturated with animal waste. Although wood chips are still used on stall floors, they must be kept separate from straw or hay for disposal as recycling fertilizer. Compost haulers will not accept stall waste which includes wood chips. Stall waste disposal is a critical issue, particularly with large animal care facilities such as zoos, racetracks, and horse farms. A stall material which cannot be economically disposed of cannot be used. This fact eliminates any material which contains wood or any other slow degrading material. Thus, a stall material is needed that performs hygienic and ergonomic functions in the stall, and a biodegradable fertilizing function in waste form has not been provided. Like the previously described prior art animal bedding materials, this approach offers no solution to the odor and ammonia production problem associated with conventional animal bedding materials.

SUMMARY OF THE PRESENT INVENTION

To overcome these and other disadvantages of the prior art, it is an object of the present invention to provide an inexpensive and effective comfortable, absorbent and deodorizing material that is useful as an animal bedding or stall floor lining material. It is a further object of the invention to provide such a material that is essentially dust free and inhibits the production of ammonia and reduces the unpleasant odor in areas where animals are housed. It is still a further object of the present invention to provide an efficient method of mass producing an animal bedding material composition having superior ammonia and odor reduction properties. It is still a further object of the invention to provide a stall floor covering composition which when soiled with animal waste provides a rapidly biodegradable fertilizer with high nitrogen content ready for immediate application by agricultural growers.

The present invention is directed to an improved animal bedding material having superior cushioning properties and ammonia and odor reduction function. In the preferred embodiment of the invention, the animal bedding material is comprised of strips or pieces of shredded corrugated cardboard combined with an ion exchange agent. The ion exchange agent may be an ammonia adsorbent material in powderized form. The strips of corrugated cardboard are formed by cutting sheets of cardboard into strips so that the corrugations between parallel outer panels remain intact. The strips or pieces are then mixed with the ion exchange agent so that it is distributed on the outer and inner surfaces of the cardboard strips and inside the corrugations of the cardboard. The corrugated air-containing structure of the cardboard pieces provides cushioning and shock absorption which relieves stress on animal hooves and legs, and promotes healing of lame animals without the need for expensive alternate stall flooring such as rubber mats.

The animal bedding material of the present invention is produced by feeding sheets of cardboard into a shredding or cutting device that performs at least two different cutting operations. In one such device, a first set of blades cuts the sheets of cardboard into strips which are then cut with a second set of blades to a desired length. Paper fiber dust is removed from the strips or pieces by a vacuum system, and the pieces are combined with an ion exchange agent in powder or particulate form. The bedding material composition is then packaged in a sealed container or bag for delivery to a stall and distributed directly upon a stall floor.

DETAILED DESCRIPTION OF PREFERRED AND ALTERNATE EMBODIMENTS

Figure 1:
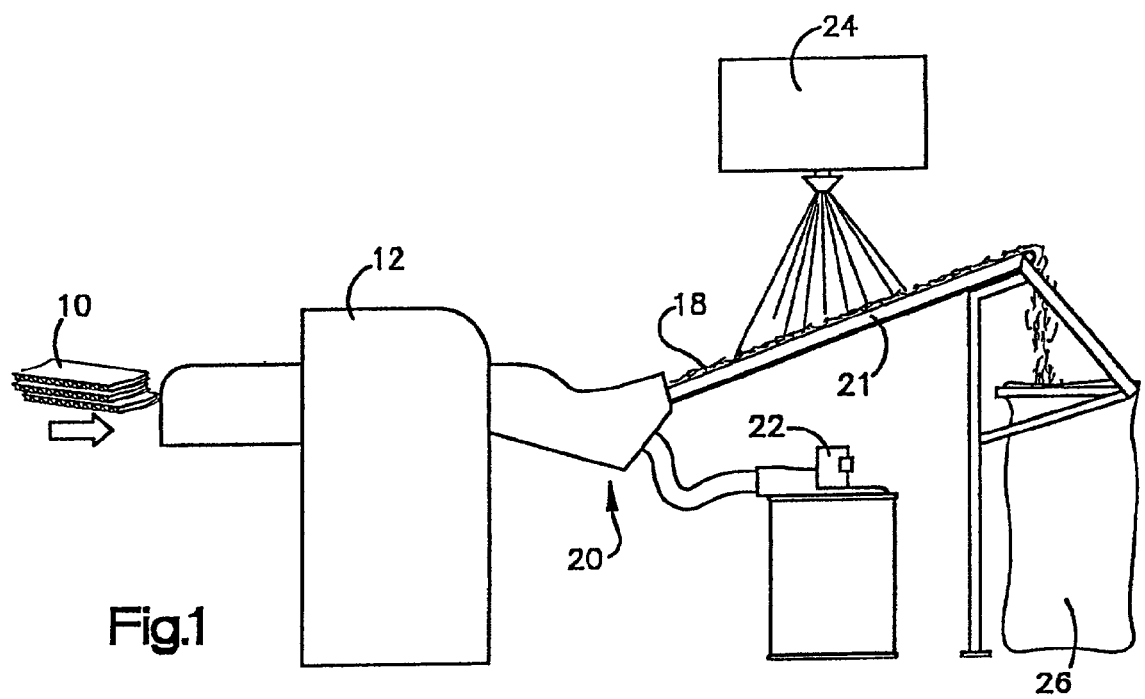
FIG. 1 is a diagrammatic view of apparatus for producing an animal bedding composition according to the method of the present invention.
Figure 2:
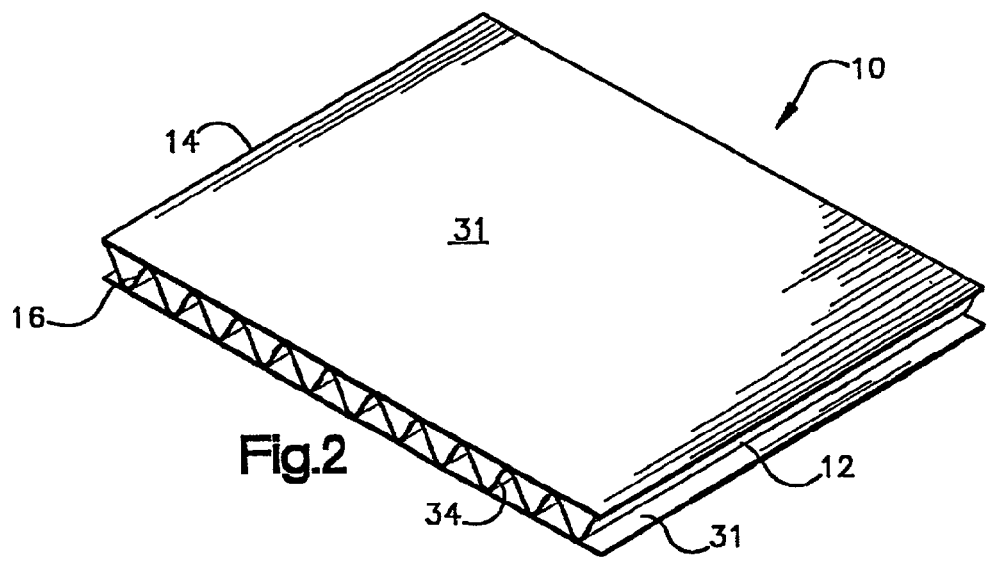
FIG. 2 is a perspective view of a sheet of corrugated cardboard used to make the animal bedding composition of the present invention.

Referring to FIGS. 1 through 4, an animal bedding composition and a method of making the animal bedding composition of the present invention is illustrated. A sheet of corrugated cardboard material 10 is provided. As shown in FIG. 2, the sheet of cardboard is comprised of a first edge 12, a second edge 14, and a plurality of corrugations 16. The corrugations 16 are generally parallel to the first edge 12 and the second edge 14 and extend the length of the sheet of corrugated cardboard 10. Thus, the internal corrugations have a longitudinal axis that is generally parallel to the first edge 12 for the sample of cardboard shown in FIG. 2. The cardboard 10 may be new or recycled stock of two panel sandwiched corrugations ranging in total thickness from approximately {fraction (1/16)}" to ½". The outer panels are preferably kraft paper (a tough paper made from sulfate wood pulp) or other fibrous cellulosic material ranging in thickness from approximately {fraction (1/32)}" to approximately ⅛". The internal corrugated layer, known as fluting, is also preferably made of kraft paper or other fibrous, cellulosic material with a flute height, as measured from one interior side of an overlying panel to an opposing side of a parallel overlying panel, in a range of approximately {fraction (1/16)}" to ¼". Preferably, the corrugated cardboard used for the composition of the invention is a C-flute size of approximately {fraction (3/16)}" height. Although shown with corrugations 16 in a general sinusoidal form, other configurations of the internal layer are possible, or any other structure which creates an air gap between the outer panels, as further described herein.

Figure 4:
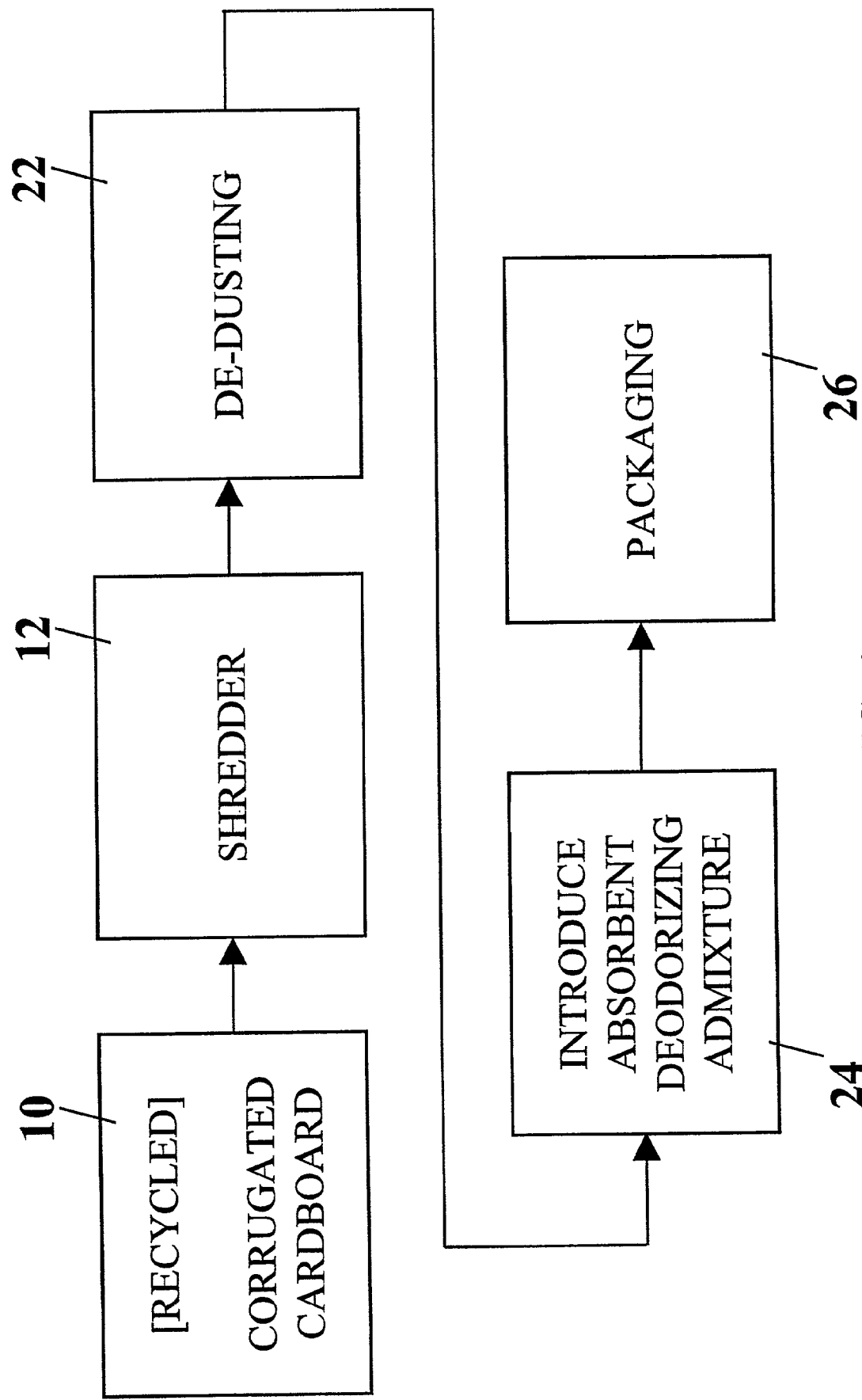
FIG. 4 is a block diagram of a manufacturing process for producing the animal bedding composition of the present invention.

With reference to FIGS. 1 and 4, one or more sheets of corrugated cardboard 10 is fed into a shredder 12. One type of shredding device which can be used in the method of this invention is the Cross Shred manufactured by Industrial Paper Shredders, Inc. of Salem, Ohio. However, other brands of shredders or other types of cutting devices may be used. The Cross Shred is capable of accepting cardboard sheets having a maximum width of about 20 inches and incorporates a two blade cutting system which first cuts the cardboard sheet into strips with a width in an approximate range of ⅛ inch to 1 inch or greater, and then chops or cuts the strips into particles having a length in an approximate range of ¼ inch to about 1 inch or greater. The sheets of corrugated cardboard 10 are fed into the shredder 12 with the corrugations 16 generally perpendicular to a first set of blades in the shredder 12. Sheets of corrugated cardboard 10 may be fed individually into the shredder, or a plurality of sheets may be stacked and fed simultaneously into the shredder 12. Using the Cross Shred machine, it is preferred that no more than three stacked sheets of corrugated cardboard 10 be fed into the shredder at a time. If more than three sheets of corrugated cardboard 10 are fed into the Cross Shred, the corrugations may be crushed, thus diminishing the shock absorption and wicking aeration action of the corrugated cardboard as further described herein. However, other cutting or shredding devices may allow more than three sheets of corrugated cardboard to be cut simultaneously without crushing the internal corrugated layer. The sheets of corrugated cardboard are cut into strips of about ⅜ inch in width. The ⅜ inch wide strips are then cut into pieces 18 having a length of about ½ inch to about 1 inch.

The pieces 18 then exit the shredder 12 at the exit point 20 and are transferred to a conveyor belt 21. A vacuum system 22 is provided at an exit point 20 from the shredder to remove and collect any paper fiber dust particles resulting from the shredding of the cardboard 10. The pieces 18 are then transferred by conveyor belt 21 to mixing containers 26 and mixed with an ion-exchange additive in powder form as may be applied from a dispensing device 24 positioned proximate to conveyor 21 whereby the additive is disposed on the pieces 18 and inside the corrugations 16. The dispensing device 24 may be shrouded to contain the powder particulates of the ion exchange agent as it is applied to the pieces. In a mass production set-up, containers 26 may be supported on a moving carousel or conveyor so that once a container is filled, it is automatically advanced to a closing or sealing station whereat the container or bag is sealed and removed from the conveyance and palletized for shipment.

One particular form of an ion-exchange agent which has been discovered to be especially well-suited for the inventive composition is one or more forms of the natural substance zeolite. Zeolites are naturally occurring volcanic minerals or synthesized materials which contain hydrogen, oxygen, aluminum and silicon arranged in a three-dimensional interconnecting lattice structure. Zeolites have the ability to selectively adsorb specific gas molecules and the ability to reversibly adsorb and desorb water. One particular form of zeolite, clinoptilolite is most preferred for use in the present invention due to its high selectivity for ammonium ions. However, other zeolites such as synthetic zeolites F and W may be used. Clinoptilote is non-toxic, edible and easily digested and has been used as a food supplement for cattle and swine to improve metabolism and lessen bloating. As such, it is safe and does not pose the health problems associated with other odor control additives such as lime. Ammonium ions are adsorbed by the clinoptilolite, reducing the amount of airborne ammonia typically found in areas where animals are housed. The reduction of airborne ammonia reduces respiratory distress it is proven to cause.

Zeolites, and in particular clinoptiloite, also have excellent agricultural fertilization properties. This is critical to the success of a stall material as it must be economically disposed of. In other words, acceptance of used stall material by agricultural growers is required in order for a stall material to be used in large quantities. Clinoptilolite is high in potassium as major exchangeable cation, providing slow release potassium, and nitrogen when pre-loaded with ammonium.

Preferably, the containers 26 are filled with pieces 18 to about 50% of capacity and about 50% of a predetermined amount of ion exchange agent in powder form is added to the pieces 18. The containers 26 are then completely filled with pieces 18 and the remaining ion exchange agent powder is mixed in. The ion exchange agent can alternatively be distributed on the pieces 18 using a sifting mechanism as the pieces 18 are moved along conveyor belt 21. A preferred form of the animal bedding composition may have from about ½ ounces to about 8 ounces of clinoptilolite per 3 cubic feet of pieces 18, preferably from about 1 ounce to about 3 ounces of clinoptilolite per 3 cubic feet of pieces 18.

Figure 3:
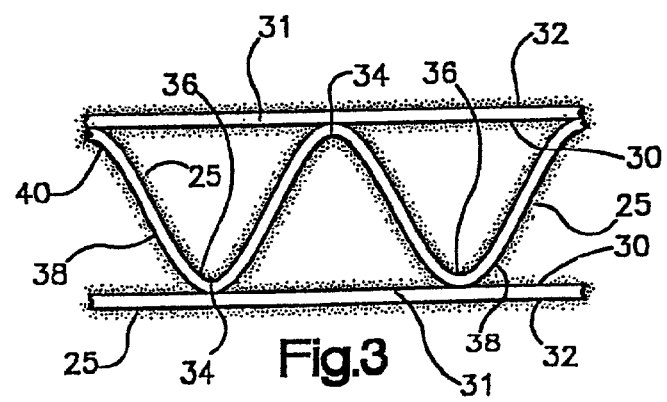
FIG. 3 is a cross sectional view of a single piece of the animal bedding composition of the present invention.

FIG. 3 shows a piece 18 of the animal bedding composition. As used herein, the term "composition" means the combination of the cardboard pieces and the particles 25 of the ion exchange agent. As illustrated, a corrugated cardboard structure includes outer generally parallel panels 31 with inner surfaces 30 and outer surfaces 32, and an inner panel 40 having a plurality of corrugations 34. The corrugations 34 each have a first surface 36 and a second surface 38. The height of the corrugations 34 from one inner surface 30 to the opposing inner surface 30 of panels 31 dictates the thickness of the cardboard structure. For purposes of practicing the invention, a corrugated cardboard structure with a relatively greater or increased thickness is preferred. Increased thickness provides a mechanical benefit of shock and pressure absorption, and provides a greater amount of internal surface area as a carrier structure for a powderized form of an ion exchange additive represented schematically, not to scale, as particles 25. The particles 25 are, through mechanical mixture, carried by and attached to the corrugated cardboard pieces 18 to form the composition.

The ion exchange agent particles 25 are disposed on the inner and outer surfaces 30 and 32, and on the inside and outside surfaces 36 and 38 of the corrugations 34. As explained, the preferred ion exchange agent is zeolite, and the most preferred zeolite is clinoptilolite. Clinoptilolite is preferred due to its excellent ammonia adsorption capability. When the zeolite is mixed with the corrugated pieces 18, and distributed on the inner and outer surfaces 30 and 32, and on the inside and outside surfaces 36 and 38 of the corrugations 34, the absorption properties of the cardboard are combined with the adsorption properties of the zeolite. Moisture is absorbed by the cardboard and adsorbed by the zeolite. This combined moisture absorption/adsorption is further combined with the mechanical cushioning and shock absorption of the corrugated structure. Further, it has been discovered that there is sufficient mechanical bonding between the adsorbent, deodorizing zeolite material and the external and internal surfaces of a corrugated cardboard structure such that the cardboard acts as both a carrier and distributor of the adsorbent, deodorizing zeolite material throughout the area of distribution of the shredded particles. It has also been discovered that, in the animal stall application as described, the corrugated cardboard structure provides a hydrodynamic wicking action to aerate and evaporate moisture from the stall floor. As the pieces 18 become wet, the air gaps between the outer panels 31 and the inner corrugated layer 34 allow air to pass through each piece to evaporate moisture. The presence of the zeolite within the air gaps of the pieces 18 increases the amount of ammonium ion exchange which occurs, thus maximizing the reduction of ammonia odor and respiratory distress.

When the composition is distributed about a stall floor, a substantial amount of the zeolite remains disposed on all surfaces of each piece 18. It is desirable that a portion of the zeolite also fall on the stall floor. Part of the animal waste is absorbed by the shredded cardboard and part of the waste works its way through the bedding material to the stall floor. The zeolite on the stall floor adsorbs ammonium from the waste that has fallen to the stall floor. The bedding material acts as a wick, slowing absorbing waste from the stall floor. The corrugations allow for air flow and slow drying, so that the pieces do not mat together.

The animal bedding composition can be spread upon a stall floor in any thickness, such as approximately 2 inches or up to 10 inches or greater depending on the type of animals housed. For example, in stalls for show or race horses, it is desirable to have a thicker layer of bedding to provide more support and cushion. The composition is periodically remixed or agitated in the stall to redistribute both the cardboard pieces and the particulates of ion exchange agent. When the composition becomes soiled with animal waste, it is collected and used as an agricultural fertilizer in direct soil applications. For example, when a portion of the composition within a stall is soiled, it is removed by pitch fork or shovel in the ordinary manner of "mucking out". The removal composition is replaced by a fresh supply of equal quantity. The soiled composition is ideally suited as a fertilizer for growing vegetables and especially mushrooms. This is due to the high carbon content of the kraft paper of which the corrugated cardboard is constructed and the excellent fertilizing properties of zeolite as a slow release of nitrogen and potassium. The carbon bonds to nitrogen present in urine, thus the urine soaked bedding composition is a nitrogen-rich fertilizer. As mentioned, critical to the superior performance of the composition as a vegetable and mushroom fertilizer is the absence of wood shavings which are not as rapidly biodegradable as cardboard. Stall materials which contain wood shavings are not acceptable to agricultural growers. Thus, wood shavings when used in stalls must be kept segregated from other materials.

The animal bedding composition of the invention is easier to spread on stall floors than the prior art bedding materials. Unlike hay and straw, the cardboard pieces do not clump together. As such, it is not necessary to separate the pieces after the material is poured onto the stall floor. This also makes the waste removal or "mucking out" procedure simpler. Because the individual pieces of the bedding material do not stick together, the animal waste separates from the bedding material more readily. As a result, relatively less material is needed to replenish the bedding. Also, the resulting waste is less bulky than with other bedding materials because a relatively large amount of the bedding material remains on the stall floor after the animal waste is removed.

Figure 5:
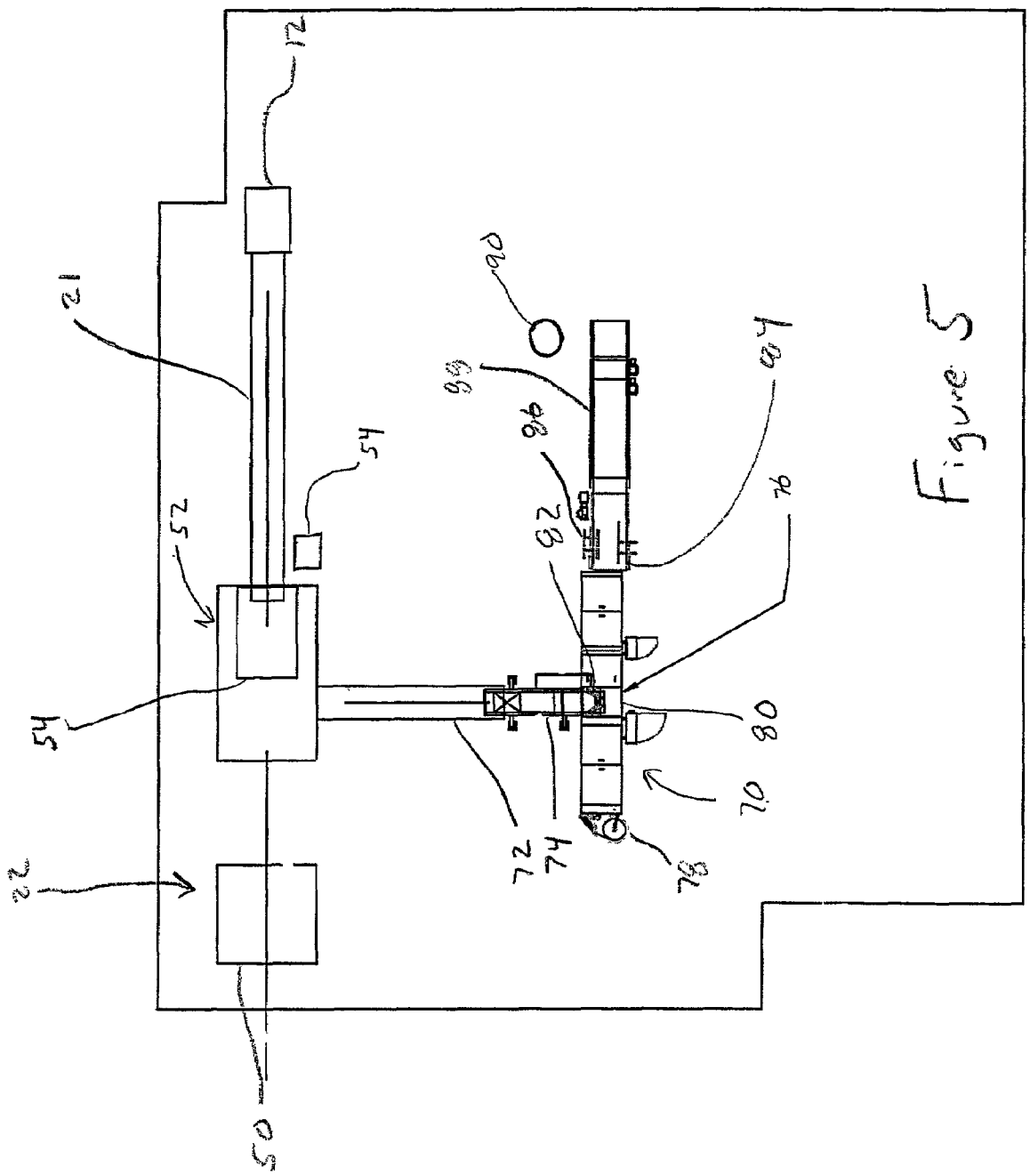
FIG. 5 is an overhead schematic of a manufacturing process and system for producing the animal bedding composition of the present invention.

Referring to FIG. 5 a process and system for manufacturing the bedding material of the present invention is shown. Cutting of corrugated cardboard boxes, sheets and/or pads is performed at shredder 12. Cutting may be done using a cross shred or cross cut process previously described. As previously described, the first cut in a cross cut or shred process cuts the cardboard with a plurality of blades to one or more strips, each having a width. Each strip is any suitable width. A length for each piece is achieved by placing a plurality of blades into the blade housing of the shredder 12. Any suitable number of blades may be used to achieve any suitable length for each piece. Thus, multiple uniform length cuts may be made simultaneously on a cardboard strip already cut to a desired width.

As previously described, vacuum system 22 removes and collects paper fiber dust particles resulting from the shredding of the cardboard. Vacuum system 22 may include a dust collector 50 which may be a pulsating baghouse or any other suitable type of collector/separator known in the art. Dust collector 50 may include one or more after filters. Vacuum system 22 may also include ductwork (not shown) leading to the shredder 12 as well as other areas where the cardboard is manipulated for collecting dust. These areas may include the conveyer belt 21 and sizing devices 52. Vacuum system 22 may also include blowers, well known in the art, to create the needed vacuum to transfer the cardboard dust.

In an embodiment, conveyor belt 21 takes the cut cardboard pieces to one or more sizing devices 52. The sizing devices may be in a position elevated with respect to the shredder 12. Elevation of the sizing devices allows gravity to assist in a process where one sized cardboard piece is separated from pieces having different sizes. Sizing devices 52 may also be rotational separators or vacuum separators of a type known in the art. In another embodiment, Sizing devices 52 may include one or more vibrating screeners 54. Vibrating screener 54 includes one or more screens, each having a different mesh size to trap a different sized cardboard piece. The mesh is any suitable size and shape. In an embodiment, the mesh has square-shaped openings.

Figure 6:
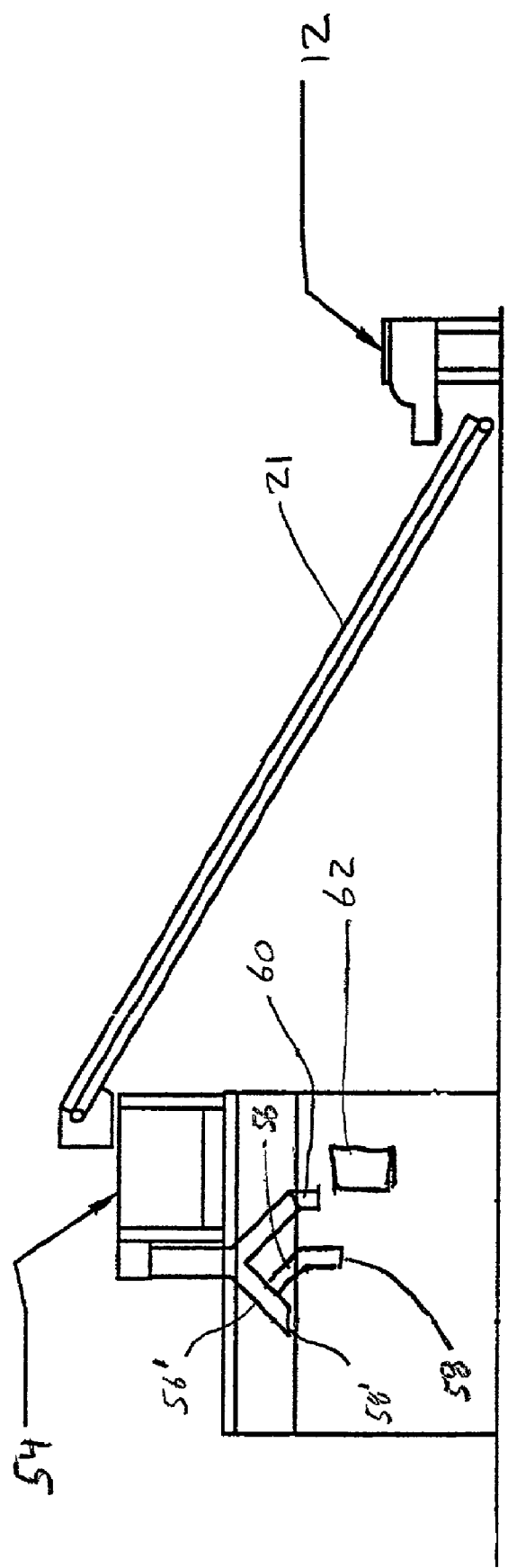
FIG. 6 is a side view schematic of the manufacturing process and system.

As shown in FIG. 6, each screen transports cardboard pieces captured upon its surface to a duct 56 and collection port 58. Transportation of the cardboard pieces is effectuated by the vibration of screener 54. Pieces too large to fall through the mesh of the screen bounce and move across the screen as the screen vibrates. Screen vibration is effectuated by any suitable mechanism, including use of two push/pull machines working in coordination to move pieces generally in one direction. In one embodiment of the invention, cardboard pieces are transported from the shredder 12, via conveyor belt 21 to a first vibrating screener 54. The first vibrating screener includes two screens (not shown). The first screen traps larger length pieces and transports these pieces to a first duct 56 and collection port 58. For example, if larger pieces are defined as pieces having a dimension greater than 1 inch, the mesh opening size for the first screen is 1 inch by 1 inch. The second screen, below the first, catches shorter length pieces which fall through the mesh of the first screen and transports these to a separate duct 56' and collection port 58'. In the above example, if smaller pieces are defined as having length and width dimensions less than 1 inch but at least one dimension greater than ⅜ inch, the mesh opening size for the second screen is ⅜ inch by ⅜ inch. The remaining cardboard fines and dust fall through a transfer port 60 to another a second screener 62 for further separation.

The sized cardboard pieces are transferred from the sizing devices 52 to a group of packaging devices 70. A separate group of packaging devices 70 may be used for each size of cardboard pieces. In an embodiment, the cardboard pieces of a particular size are transported using a conveyor belt 72 to a hopper 74. Pieces from the hopper 74 are fed to a form/fill/seal bagger 76. The bagger operates first by sealing a length of pre-printed center-fold film, taken from a supply roll 78, on two sides to form a bag. A volumetric bagger 80 drops a metered amount of cardboard pieces from the hopper 74 into the open bag. In another embodiment, while the bag is being filled, a volumetric controlled device 82 meters and dispenses a measured amount of an ion-exchange agent, such as a zeolite such as clinoptilolite, into the pieces.

The cardboard pieces settle within the bag with the aide of arms (not shown) pulsating up and down beneath the bag upon the form/fill/seal bagger 76. The bag may include moon shaped slits on its top to allow the removal of excess air. The bag moves along a conveyor 84 where the bag is further manipulated by straightening devices 86 and a flattener 88 to remove excess air. Multiple bags may then be removed from the conveyor 84, grouped together and placed upon a shrink wrap machine 90 to be bound together.

Accordingly, the preferred and alternate embodiments of the present invention have been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

The invention claimed is:

1. A method of making animal bedding composition, the method comprising the steps of:
   providing corrugated cardboard having outer panels and internal corrugations that have a longitudinal axis;
   cutting the corrugated cardboard into pieces a first time to make cuts generally perpendicular to the longitudinal axis of the corrugations and a second time generally parallel to the longitudinal axis of the corrugations wherein the second time is after the first time; and
   removing dust particles from the pieces.

2. The method of claim 1 wherein the cutting step comprises the steps of:
   providing a shredder having a plurality of first blades and a plurality of second blades;
   feeding the cardboard into the shredder so that the internal corrugations are generally perpendicular to the first blades;
   cutting the cardboard into strips with the first blades; and
   cutting the strips to length with the second blades.

3. The method of claim 2 wherein the step of cutting with the first blades comprises cutting the cardboard into strips with a width in a range of about ¼ inch to about 2 inches.

4. The method of claim 3 wherein the step of cutting with the second blades comprises cutting the strips to a length in a range of about ½ inch to about 24 inches.

5. A method of making animal bedding composition comprising:
 providing corrugated cardboard having outer panels and internal corrugations;
 cutting the corrugated cardboard into pieces so that the internal corrugations remain intact;
 removing dust particles from the pieces; and
 mixing an ion exchange agent in powder form with the pieces so that the ion exchange agent is disposed on outer and inner panels of the pieces and on outer and inner surfaces of the internal corrugations of the corrugated cardboard.

6. The method of claim 5 wherein the ion exchange agent is clinoptilolite.

7. A method of making animal bedding composition, the method comprising the steps of:
 providing corrugated cardboard having outer panels and internal corrugations that have a longitudinal axis
 cutting the corrugated cardboard into pieces so that the internal corrugations remain intact by providing a shredder having first blades and second blades, feeding the cardboard into the shredder so that the longitudinal axis of the internal corrugations is generally perpendicular to the first blades, cutting the cardboard into strips having a width in a range of about ⅛ inch to about 2 inches with the first blades; and cutting the strips to length with the second blades generally parallel with the longitudinal axis of the internal corrugations;
 removing dust particles from the pieces;
 separating the pieces into a plurality of groups defined by size using at least two vibrating separators; and
 bagging at least one of the groups of pieces.

8. The method of claim 7 wherein the plurality of groups defined by size includes a large pieces group, a smaller pieces group, a fines group and a dust group.

9. The method of claim 7 wherein the step of cutting with the second blades comprises cutting the strips to a length in a range of about ½ inch to about 24 inches.

10. The method of claim 7 further including the step of mixing an ion exchange agent in powder form with the pieces during the bagging step so that the ion exchange agent is disposed on outer and inner panels of the pieces and on outer and inner surfaces of the internal corrugations of the corrugated cardboard.

11. A method of making animal bedding composition comprising
 providing corrugated cardboard having outer panels and internal corrugations;
 cutting the corrugated cardboard into pieces so that the internal corrugations remain intact by
  providing a shredder having first blades and a second blades,
  feeding the cardboard into the shredder so that the internal corrugations are generally perpendicular to the first blades,
  cutting the cardboard into strips having a width in a range of about ⅛ inch to about 2 inches with the first blades; and
 cutting the strips to length with the second blades;
 removing dust particles from the pieces;
 separating the pieces into a plurality of groups defined by size using at least two vibrating separators; and
 bagging at least one of the groups of pieces and mixing an ion exchange agent in powder form with the pieces during the bagging step so that the ion exchange agent is disposed on outer and inner panels of the pieces and on outer and inner surfaces of the internal corrugations of the corrugated cardboard.

12. A method of making animal bedding composition comprising
 cutting corrugated cardboard having outer panels and internal corrugations that have a longitudinal axis a first time along a line transverse to the longitudinal axis of the corrugations;
 after cutting the cardboard the first time, cutting the cardboard a second time along a line generally parallel with the longitudinal axis of the corrugations; and
 depositing the twice cut cardboard as an animal bedding.

* * * * *